United States Patent Office 2,813,896
Patented Nov. 19, 1957

2,813,896
PROCESS FOR PREPARING ORGANIC PERACIDS

Heinrich Krimm, Krefeld-Uerdingen, Germany, assignor to Farbenfabriken Bayer Aktiengesellschaft, Leverkusen, Germany, a corporation of Germany No Drawing. Application December 8, 1953,
Serial No. 397,029

Claims priority, application Germany December 12, 1952

8 Claims. (Cl. 260—502)

This invention comprises a process whereby organic peracids may be obtained in good yield and in high concentrations in a technically simple and safe manner. The uses of such organic peracids as oxidation agents, disinfecting agents, bleaching agents and catalysts are well known and have been previously set forth in such publications as German Patent 156,998 where their uses as oxidation and disinfecting agents are described, in Swiss Patent 230,678 where their utility as bleaching agents are described and in "Kurzes Handbuch der Polymerisationstechnic," Franz Krczil, vol. II, 1941, pages 75, 86, 112 and 196, where their utility as catalysts are described.

It is known to prepare organic peracids by reacting organic acids or acid anhydrides with hydrogen peroxide in the presence of small quantities say 1% of sulphuric acid (calculated on the hydrogen peroxide) as catalyst. This process depends on an equilibrium reaction of the type:

$$RCOOH + H_2O_2 \rightleftharpoons RCOOOH + H_2O$$

wherein R stands for an organic radical.

When working with 30% hydrogen peroxide the yield, owing to the presence of water in the reaction mixture, is comparatively low, and the peracid obtained is dilute. Improved yields and higher peracid concentrations are obtained with hydrogen peroxide free from water; but even then peracids free from water can only be obtained by repeated fractional distillation.

The known process entails a further disadvantage in that the strongly exothermic reaction of the organic acid or acid anhydride with the hydrogen peroxide often increases spontaneously under the above conditions to explosive violence.

It has now been found that when reacting organic acids or acid anhydrides with hydrogen peroxide in the presence of sulphuric acid organic peracids may be obtained in good yield and in high concentrations in a technically simple and safe manner by using such amounts of sulphuric acid that $H_2SO_4$ and $H_2O$ are at the rate of at least 1 mol to 6 mols at the end of the reaction. Generally it is preferable to use more sulphuric acid, e. g. 1 mol $H_2SO_4$ to about 4 or 3 mols $H_2O$ or less. The optimum quantitative relationship between the water amount and the sulphuric acid amount of the reaction mixture may in any particular case be readily determined by simple experiment.

With suitable amounts of sulphuric acid the above mentioned results may be obtained even with 30% hydrogen peroxide. According to the new process peracids practically free of water may be obtained in many cases from the reaction mixture directly by distillation in vacuo; for the high sulphuric acid content of the mixture reduces the partial pressure of the water vapour to such an extent that water will no longer distil over. In other cases there are obtained peracids capable of crystallising out, which may be separated by simple filtration from the reaction solution. Since, notwithstanding the above mentioned equilibrium, the peracids, once formed, hydrolyse only comparatively slowly, the mixture may after completion of the reaction be diluted with water for a short period of time and the peracids be extracted with organic solvents. The reaction according to the invention proceeds so smoothly as to permit the preparation of peracids such as, per-benzoic acid which as yet could not be obtained from the corresponding carboxylic acids, or of peracids such as the well-crystallising di-peracids of dicarboxylic acids which as yet had not all been prepared.

Since, unexpectedly, the peracids proved to be remarkably stable in the strong sulphuric acid solutions the new process may in contrast to that previously known be carried out without danger.

In contrast with the diluted acids which are obtained by the prior art, the highly concentrated peracids which may be obtained to the invention are even in their isolated form surprisingly stable.

Suitable starting materials for the new process include: aliphatic monocarboxylic acids, such as acetic acid, chloroacetic acid, dichloroacetic acid, trichloroacetic acid, fluoroacetic acid, trifluoroacetic acid, cyclohexyl acetic acid, phenyl acetic acid, propionic acid, the chloropropioni acids, the butyric acids, the chlorobutyric acids, the valeric acids, pivalic acid, caproic acid, oenanthic acid, caprylic acid, pelargonic acid, capric acid, lauric acid, palmitic acid and stearic acid, aliphatic dicarboxylic acids, such as: malonic acid, succinic acid, chlorosuccinic acid, glutaric acid, α-, β-methylglutaric acid, adipic acid, α-, β-methyladipic acid, pimelic acid, suberic acid, azelaic acid and sebacic acid, cycloaliphatic mono- and dicarboxylic acids, such as: cyclopentane carboxylic acid, cyclohexane carboxylic acid, the methyl cyclohexane carboxylic acids and the cyclohexane dicarboxylic acids, aromatic mono- and dicarboxylic acids, such as: benzoic acid, o-, m- and p-nitrobenzoic acid, o-, m- and p-chlorobenzoic acid, o-, m- and p-toluic acid, α-, β-naphthoic acid, phthalic acid, isophthalic acid and terephthalic acid. In some cases anhydrides of the acids mentioned before also may be used.

Suitable temperatures for the reaction are from about −50° to about +50° C., especially from about −10° to about +10° C.

In the following examples the parts are by weight and the temperatures refer to degrees centigrade.

Example 1

To 460 parts 30% hydrogen peroxide are added drop by drop whilst cooling with ice-water 700 parts concentrated sulphuric acid and thereafter 240 parts glacial acetic acid. The ratio of $H_2SO_4$ and $H_2O$ here is about 1:3 mols. After standing overnight the peracetic acid that has formed is slowly distilled in apparatus made from glass, a water jet vacuum being applied. There are obtained first 280 parts of an 82% peracetic acid having a boiling point of 22–28° C. at 15 mm. mercury. By increasing the temperature of the bath from initially 50° C. to finally 90° C. a further 160 parts of a 34% peracetic acid are distilled.

The total yield amounts to 91%.

When starting instead of from 240 parts of glacial acetic acid with 204 parts of acetic acid anhydride an approximately similar yield is obtained.

Example 2

To 230 parts 30% hydrogen peroxide are added drop by drop whilst cooling with ice-water 750 parts concentrated sulphuric acid and thereafter 190 parts chloroacetic acid. The ratio of $H_2SO_4$ and $H_2O$ here is about 1:1.5 mols. After standing overnight the homogeneous solution is shaken four times with altogether 800 parts of methylene chloride. An 11.8% solution of the perchloro-acetic acid in 80% yield is obtained.

*Example 3*

To 460 parts 30% hydrogen peroxide are added drop by drop whilst cooling with ice-water 700 parts concentrated sulphuric acid and thereafter 352 parts n-butyric acid. The ratio of $H_2SO_4$ and $H_2O$ here is about 1:3 mols. After standing overnight the perbutyric acid is distilled in the manner described in Example 1. 500 parts of a 75% perbutyric acid having a boiling point of 26–29° C. at 12 mm. mercury are obtained.

The yield amounts to 90%.

When interrupting the distillation at an earlier stage perbutyric acid of substantially increased concentration is obtained.

*Example 4*

To 460 parts of 30% hydrogen peroxide are added drop by drop whilst cooling with ice-water 1500 parts concentrated sulphuric acid and thereafter 576 parts caprylic acid. The ratio of $H_2SO_4$ and $H_2O$ here is about 1:1.5 mols. Thereafter the solution is vigorously stirred for 20 hours. The upper layer is then taken up with petroleum ether and dried over sodium sulphate. After distilling off the petroleum ether, finally in vacuo, 600 parts of a 71% percaprylic acid are obtained.

The yield amounts to 66%.

*Example 5*

To 230 parts 30% hydrogen peroxide are added drop by drop whilst cooling with ice-water 500 parts concentrated sulphuric acid and thereafter 73 parts adipic acid. The ratio of $H_2SO_4$ and $H_2O$ here is about 1:2 mols. After standing overnight the crystal sludge is cooled in a cooling mixture, filtered with suction through a glass filter, a strong vacuum being applied, and washed with water. 71 parts of the so far not described diperadipic acid are obtained.

The yield amounts to 80%.

The acid melts after recrystallising from ether or tetrahydrofuran at 114–115° with decomposition. $C_6H_{10}O_6$ (178.1): Calculated: C, 40.45; H, 5.66; O active, 17.96. Found: C, 40.30; H, 5.98; O active, 17.38.

*Example 6*

To 230 parts 30% hydrogen peroxide are added drop by drop with cooling in ice-water 500 parts concentrated sulphuric acid and thereafter 100 parts sebacic acid in powder form. The ratio of $H_2SO_4$ and $H_2O$ here is about 1:2 mols. After standing overnight the crystal sludge that has formed is filtered with suction through a glass filter and washed with ice-water. 110 parts of the not yet described dipersebacic acid having a melting point of 96–97° are obtained in practically quantitative yield. $C_{10}H_{18}O_6$ (234.2): Calculated: C, 51.27; H, 7.75; O active, 13.66. Found: C, 51.21; H, 8.12; O active, 13.25.

*Example 7*

In a mixture of 230 parts 30% hydrogen peroxide and 500 parts concentrated sulphuric acid are suspended 122 parts benzoic acid and so much ether is added with cooling that a homogeneous solution is arrived at. The ratio of $H_2SO_4$ and $H_2O$ here is about 1:2 mols. After standing for two days at room temperature dilution is carried out with double the quantity of ice-water, the ether layer is separated and the aqueous layer is again shaken out with 500 parts of ether. A solution which according to potassium iodide/thiosulphate titration contains 44 parts benzoic peracid is obtained.

The yield amounts to 32%.

I claim:

1. A process for preparing organic peracids which comprises reacting at a temperature from about −50 to about +50° C. a carboxylic acid selected from the group consisting of monocarboxylic and dicarboxylic aliphatic, cycloaliphatic and aromatic acids and acid anhydrides thereof with aqueous hydrogen peroxide solution in the presence of sulphuric acid in such a quantity that $H_2SO_4$ and $H_2O$ are at a ratio of at least 1 mol to 6 mols at the end of the reaction.

2. The process of claim 1, wherein the molar ratio is one mol to about 4 to 1.5 mols.

3. Process for preparing peracetic acid which comprises reacting at temperatures from about −10° to about +10° C. glacial acetic acid with a 30% aqueous hydrogen peroxide solution in the presence of sulphuric acid in such a quantity that $H_2SO_4$ and $H_2O$ are at the rate of 1 mol to about 3 mols at the end of the reaction.

4. Process for preparing diperadipic acid which comprises reacting at temperatures from about −10° to about +10° C. adipic acid with a 30% aqueous hydrogen peroxide solution in the presence of sulphuric acid in such a quantity that $H_2SO_4$ and $H_2O$ are at the rate of 1 mol to about 2 mols at the end of the reaction.

5. Process for preparing dipersebacic acid which comprises reacting at temperatures from about −10° to about +10° C. sebacic acid with a 30% aqueous hydrogen peroxide solution in the presence of sulphuric acid in such a quantity that $H_2SO_4$ and $H_2O$ are at the rate of 1 mol to about 2 mols at the end of the reaction.

6. Process for preparing benzoic peracid which comprises reacting at temperatures from about −10° to about +10° C. benzoic acid with a 30% aqueous hydrogen peroxide solution in the presence of sulphuric acid in such a quantity that $H_2SO_4$ and $H_2O$ are at the rate of 1 mol to about 2 mols at the end of the reaction.

7. Diperadipic acid.

8. Dipersebacic acid.

References Cited in the file of this patent

UNITED STATES PATENTS

| | | |
|---|---|---|
| 1,863,698 | Schulze | June 21, 1932 |
| 2,377,038 | Reichert et al. | May 29, 1945 |
| 2,604,440 | Brooks et al. | July 22, 1952 |

OTHER REFERENCES

Swern: Chem. Rev., vol. 45, pp. 4 to 6 and 11 (1949).